United States Patent
Tanaka et al.

(10) Patent No.: US 9,580,617 B2
(45) Date of Patent: Feb. 28, 2017

(54) WATER-BASED INK FOR INK-JET RECORDING, INK CARTRIDGE AND METHOD FOR PRODUCING WATER-BASED INK FOR INK-JET RECORDING

(71) Applicant: Brother Kogyo Kabushiki Kaisha, Nagoya-shi, Aichi-ken (JP)

(72) Inventors: Hiroyuki Tanaka, Inazawa (JP); Michiko Aoyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/089,907

(22) Filed: Apr. 4, 2016

(65) Prior Publication Data

US 2016/0215158 A1  Jul. 28, 2016

Related U.S. Application Data

(62) Division of application No. 14/671,166, filed on Mar. 27, 2015, now abandoned.

(30) Foreign Application Priority Data

Mar. 28, 2014 (JP) ................................ 2014-070558

(51) Int. Cl.
| | |
|---|---|
| G01D 11/00 | (2006.01) |
| C09D 11/00 | (2014.01) |
| B41J 2/17 | (2006.01) |
| C09D 11/38 | (2014.01) |
| C09D 11/023 | (2014.01) |

(52) U.S. Cl.
CPC ............ *C09D 11/38* (2013.01); *C09D 11/023* (2013.01)

(58) Field of Classification Search
CPC ....... C09D 11/322; C09D 11/40; C09D 11/38; C09D 11/30; C09D 11/023; B41J 2/2107; B41J 2/211
USPC ............. 347/95, 100; 106/31.13, 31.25, 31.6
See application file for complete search history.

(56) References Cited

U.S. PATENT DOCUMENTS

| | | |
|---|---|---|
| 5,565,022 A | 10/1996 | Wickramanayake |
| 5,952,414 A | 9/1999 | Noguchi et al. |
| 8,016,404 B2 | 9/2011 | Kato et al. |
| 8,394,185 B2 | 3/2013 | Ezaki et al. |
| 2008/0241398 A1 | 10/2008 | Kato et al. |

(Continued)

FOREIGN PATENT DOCUMENTS

| | | |
|---|---|---|
| JP | H09111165 A | 4/1997 |
| JP | 2005-219372 A | 8/2005 |

(Continued)

OTHER PUBLICATIONS

Apr. 13, 2016—(US) Non-Final Office Action—U.S. Appl. No. 14/658,290.

(Continued)

*Primary Examiner* — Jannelle M Lebron
(74) *Attorney, Agent, or Firm* — Banner & Witcoff, Ltd.

(57) ABSTRACT

A water-based ink for ink-jet recording includes: a water-soluble colorant; water; a water-insoluble liquid; a nonionic surfactant; and an ionic surfactant having a polarity same as that of the water-soluble colorant. The water-insoluble liquid is dispersed stably in the water by the nonionic surfactant and the ionic surfactant having the polarity same as that of the water-soluble colorant.

19 Claims, 2 Drawing Sheets

(56) References Cited

U.S. PATENT DOCUMENTS

| | | | |
|---|---|---|---|
| 2010/0180795 A1 | 7/2010 | Ezaki et al. | |
| 2013/0021406 A1 | 1/2013 | Stoeva et al. | |
| 2013/0305958 A1 | 11/2013 | Birecki et al. | |
| 2014/0036010 A1 | 2/2014 | Hasegawa et al. | |
| 2015/0116417 A1* | 4/2015 | Chopra | B41J 2/0057 347/20 |
| 2015/0275011 A1 | 10/2015 | Tanaka et al. | |

FOREIGN PATENT DOCUMENTS

| | | | |
|---|---|---|---|
| JP | 2007-224079 A | 9/2007 |
| JP | 2008-246821 A | 10/2008 |
| JP | 2010-168455 A | 8/2010 |

OTHER PUBLICATIONS

Mar. 16, 2015—(US) Co-pending U.S. Appl. No. 14/658,290.
Mar. 27, 2015—(US) Co-pending U.S. Appl. No. 14/671,166.
Sep. 1, 2015—(US) Non-Final Action—U.S. Appl. No. 14/671,166.
Jan. 11, 2016—(US) Final Office Action—U.S. Appl. No. 14/671,166.
Aug. 10, 2016—(US) Notice of Allowance—U.S. Appl. No. 14/658,290.

\* cited by examiner

WATER-BASED INK FOR INK-JET RECORDING, INK CARTRIDGE AND METHOD FOR PRODUCING WATER-BASED INK FOR INK-JET RECORDING

CROSS REFERENCE TO RELATED APPLICATIONS

This application is a division of U.S. application Ser. No. 14/671,166, filed Mar. 27, 2015, which claims priority from Japanese Patent Application No. 2014-070558 filed on Mar. 28, 2014, the disclosures of which are incorporated herein by reference in its entirety.

BACKGROUND OF THE INVENTION

Field of the Invention

The present invention relates to a water-based ink for ink-jet recording, an ink cartridge and a method for producing a water-based ink for ink-jet recording.

Description of the Related Art

There is a suggestion to provide a new function to a water-based ink by adding a water-insoluble liquid to the water-based ink. For example, to increase a drying property of a water-based ink, a specific water-insoluble liquid may be added to the water-based ink. To disperse an oil dye in the oil-in-water type emulsion ink, a specific water-insoluble liquid may be used as a dispersant in the oil-in-water type emulsion ink.

For adding the water-insoluble liquid as described above to the water-based ink, however, it is necessary that the water-insoluble liquid is made to disperse in the water-based ink, and further that the dispersed state of the water-insoluble liquid in the water-based ink is maintained for a long period of time. In view of this situation, an object of the present teaching is to provide a water-based ink for ink-jet recording wherein the water-insoluble liquid is dispersed stably in the water-based ink.

SUMMARY OF THE INVENTION

According to a first aspect of the present teaching, there is provided a water-based ink for ink-jet recording including:

a water-soluble colorant;
water;
a water-insoluble liquid;
a nonionic surfactant; and
an ionic surfactant having a polarity same as that of the water-soluble colorant;
wherein the water-insoluble liquid is dispersed in the water by the nonionic surfactant and the ionic surfactant having the polarity same as that of the water-soluble colorant. According to a second aspect of the present teaching, there is provided an ink cartridge configured to contain a water-based ink for ink-jet recording, which is the water-based ink for ink-jet recording according to the first aspect.

According to a third aspect of the present teaching, there is provided a method for producing a water-based ink for ink-jet recording, the method including:

a step of preparing a first liquid by mixing a water-soluble colorant and water; and a step of preparing a second liquid by mixing a water-insoluble liquid and a nonionic surfactant;

a step of preparing a third liquid by mixing the water and an ionic surfactant having a polarity same as that of the water-soluble colorant;

a step of preparing a fourth liquid by mixing the second liquid and the third liquid; and a step of preparing a water-based ink by mixing the fourth liquid and the first liquid to prepare the water-based ink for ink-jet recording.

According to the water-based ink for ink-jet recording of the present teaching, it is possible to allow the water-insoluble liquid to be dispersed stably in the water by the nonionic surfactant and the ionic surfactant having the polarity same as that of the water-soluble colorant. Accordingly, a variety of kinds of functions possessed by the water-insoluble liquid can be effectively expressed in the water-based ink.

DESCRIPTION OF THE PREFERRED EMBODIMENTS

Figure 1A:
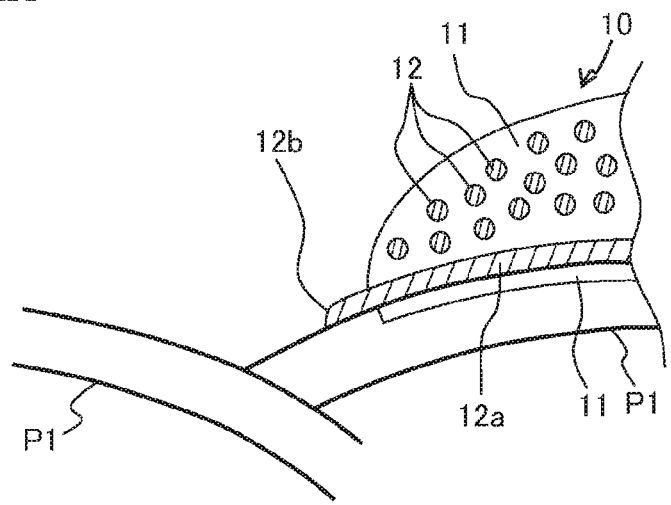
FIG. 1A is a conceptual view for explaining a presumed mechanism of improving the drying property in the present teaching, and depicts a state that a water-based ink has landed on a recording paper.

An explanation will be given about a specific example of a water-based ink for ink-jet recording of the present teaching. In the following, the water-based ink for ink-jet recording is also referred as "water-based ink" or "ink" in some cases. The water-based ink of the present teaching includes a water-soluble colorant, water, a water-insoluble liquid, and two kinds of surfactants which will be described later on.

The water-soluble colorant can be exemplified, for example, by a dye, etc. The dye is not particularly limited and can be exemplified, for example, by direct dye, acid dye, basic dye, reactive dye, etc. Among these dyes, the basic dye is a cationic dye, and the direct, acid and reactive dyes are likely to belong to anionic dyes. The dye may be exemplified, for example, by Color Index (hereinafter referred to as C. I.) Direct Black, C.I. Direct Blue, C.I. Direct Red, C.I. Direct Yellow, C.I. Direct Orange, C.I. Direct Violet, C.I. Direct Brown, C.I. Direct Green; C.I. Acid Black, C.I. Acid Orange, C.I. Acid Violet; C.I. Basic Black, C.I. Basic Blue, C.I. Basic Red, C.I. Basic Violet; C.I. Food Black; etc. The C.I. Direct Black is exemplified, for example, by C. I. Direct Black 17, 19, 32, 51, 71, 108, 146, 154, 168, etc. The C.I. Direct Blue is exemplified, for example, by C. I. Direct Blue 6, 22, 25, 71, 86, 90, 106, 199, etc. The C.I. Direct Red is exemplified, for example, by C. I. Direct Red 1, 4, 17, 28, 83, 227, etc. The C.I. Direct Yellow is exemplified, for example, by C.I. Direct Yellow 12, 24, 26, 86, 98, 132, 142, 173, etc. The C.I. Direct Orange is exemplified, for example, by C. I. Direct Orange 34, 39, 44, 46, 60, etc. The C.I. Direct Violet is exemplified, for example, by C. I. Direct Violet 47, 48, etc. The C.I. Direct Brown is exemplified, for example, by C. I. Direct Brown 109, etc. The C.I. Direct Green is exemplified, for example, by C. I. Direct Green 59, etc. The C.I. Acid Black is exemplified, for example, by C. I. Acid Black 2, 7, 24, 26, 31, 52, 63, 112, 118, etc. The C.I. Acid Blue is exemplified, for example, by C. I. Acid Blue 9, 22, 40, 59, 90, 93, 102, 104, 117, 120, 167, 229, 234, etc. The C.I. Acid Red is exemplified, for example, by C. I. Acid Red 1, 6, 32, 37, 51, 52, 80, 85, 87, 92, 94, 115, 180, 256, 289, 315, 317, etc. The C.I. Acid Yellow is exemplified, for example, by C. I. Acid Yellow 11, 17, 23, 25, 29, 42, 61, 71, etc. The C.I. Acid Orange is exemplified, for example, by C. I. Acid Orange 7, 19, etc. The C.I. Acid Violet is exemplified, for example, by C. I. Acid Violet 49, etc. The C.I. Basic Black is exemplified, for example, by C.I. Basic Black 2, etc. The C.I. Basic Blue is exemplified, for example, by C.I. Basic Blue 1, 3, 5, 7, 9, 24, 25, 26, 28, 29, etc. The C.I. Basic Red is exemplified, for example, by C. I. Basic Red 1, 2, 9, 12, 13, 14, 37, etc. The C.I. Basic Violet is exemplified, for example, by C. I. Basic Violet 7, 14, 27, etc. The C.I. Food Black is exemplified, for example, by C. I. Food Black 1, 2, etc.

The blending amount of the water-soluble colorant (water-soluble colorant ratio) in the entire amount of the water-based ink is not particularly limited, and the blending amount is, for example, in a range of 0.5% by weight to 8% by weight, preferably in a range of 1% by weight to 4.5% by weight, and more preferably in a range of 1% by weight to 3% by weight. By making the water-soluble colorant ratio be in a range of 1% by weight to 4% by weight, it is possible to obtain a water-based ink which is further excellent in the stability.

The water is preferably ion-exchanged water or pure water (purified water). The blending amount of the water (water ratio) in the entire amount of the water-based ink is, for example, in a range of 10% by weight to 90% by weight, and preferably in a range of 40% by weight to 80% by weight. The water ratio may be, for example, the balance of the other components.

The water-based ink of the present teaching contains a water-insoluble liquid in a state that the water-insoluble liquid is dispersed in the water-based ink. It is possible to use, as the water-insoluble liquid, a water-insoluble liquid which realizes a variety of kinds of functions such as improved drying property, dispersion of oil dye, etc., to the water-based ink. Such a water-insoluble liquid can be exemplified, for example, by diethyl adipate, diisononyl adipate, diethyl phthalate, high-molecular weight polypropylene glycol (PPG) (having a molecular weight of greater than 200), polybutylene glycol, decane, undecane, dodecane, liquid paraffin, dimethylpolysiloxane, perfluorocarbon, etc. The molecular weight of polypropylene glycol is preferably greater than 200 and not more than 2,000, more preferably not less than 400 and not more than 2,000. The functions such as the improved drying property of the water-based ink, etc., will be described later on.

As described above, the water-based ink of the present teaching further contains the nonionic surfactant and the ionic surfactant having the charge (polarity) same as the charge (polarity) of the water-soluble colorant (hereinafter referred to as the "same charge-ionic surfactant).

The nonionic surfactant is exemplified, for example, by a sorbit-based surfactant, an acetylenic glycol-based surfactant, a sorbitan-based surfactant, a polyoxyalkylene alkyl ether-based surfactant, etc.

The sorbit-based surfactant is exemplified, for example, by a surfactant represented by the following formula (1), etc.

[Formula 1]

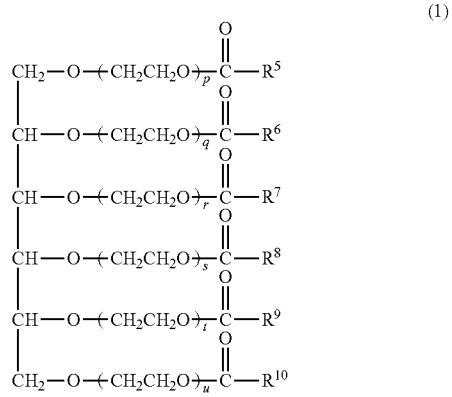

in the formula (1), each of $R^5$ to $R^{10}$ is a hydrogen atom or an alkyl group of which carbon atom number is 18; "p", "q", "r", "s", "t" and "u" may be identical to one another or different from one another, and are numbers satisfying: $30 \leq p+q+r+s+t+u \leq 80$.

It is allowable to use, for example, any commercially available product as the sorbit-based surfactant. The commercially available product is exemplified, for example, by "SORBON (trade name) TR-843" (polyoxyethylene sorbitol tetraoleate), produced by Toho Chemical Industry Co., Ltd., etc.

The acetylenic glycol-based surfactant is exemplified, for example, by a surfactant represented by the following formula (2), etc.

[Formula 2]

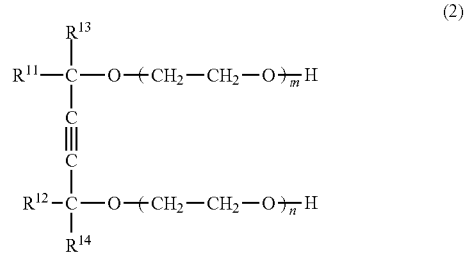

In the formula (2), "m" and "n" may be identical to each other or different from each other, and are numbers satisfying: $m+n=1$ to 15 and preferably satisfying: $m+n=3$ to 11; each of $R^{11}$, $R^{12}$, $R^{13}$ and $R^{14}$ is a straight-chain or branched-chain alkyl group of which carbon atom number is 1 to 5, and $R^{11}$, $R^{12}$, $R^{13}$ and $R^{14}$ may be identical to one another or different from one another. The alkyl group is exemplified, for example, by a methyl group, an ethyl group, a propyl group, an isopropyl group, a butyl group, etc.

It is allowable to use, for example, any commercially available product as the acetylenic glycol-based surfactant. The commercially available product is exemplified, for example, by "OLFIN (trade name) E1010", "OLFIN (trade name) E1004", "SURFYNOL (trade name) 440", "SURFYNOL (trade name) 465" which are produced by Nisshin Chemical Co., Ltd.; "ACETYLENOL (trade name) E40" and "ACETYLENOL (trade name) E100" produced by Kawaken Fine Chemicals Co., Ltd.; and the like.

The sorbitan-based surfactant is exemplified, for example, by a surfactant represented by the following formula (3), etc.

[Formula 3]

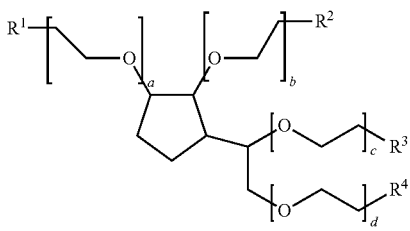

(3)

in the formula (3), each of $R^1$, $R^2$, $R^3$ and $R^4$ is a hydroxyl group, or a saturated or unsaturated fatty acid of which carbon atom number is 12 to 18; and "a", "b", "c" and "d" may be identical to each other or different from each other, and are numbers satisfying: $a+b+c+d \geq 20$.

The saturated or unsaturated fatty acid of which carbon atom number is 12 to 18 is exemplified, for example, by lauric acid, myristic acid, palmitic acid, stearic acid, palmitoleic acid, oleic acid, ricinoleic acid, linoleic acid, etc., and is preferably the lauric acid, stearic acid and oleic acid. Further, in the formula (3), it is preferable that $20 \leq a+b+c+d \leq 160$.

It is allowable to use, for example, any commercially available product as the sorbitan-based surfactant. The commercially available product is exemplified, for example, by "RHEODOL (trade name) TW-0106V (polyoxyethylene sorbitan monooleate), "RHEODOL (trade name) TW-L120 (polyoxyethylene sorbitan monolaurate), "RHEODOL (trade name) TW-IS399C (polyoxyethylene sorbitan tri-isostearate), etc., which are produced by KAO CORPORATION.

The polyoxyalkylene alkyl ether-based surfactant is exemplified, for example, by polyoxyethylene alkyl ether, polyoxypropylene alkyl ether, etc. It is also allowable to use, for example, any commercially available product as the polyoxyalkylene alkyl ether-based surfactant. The commercially available product is exemplified, for example, by "EMULGEN (trade name) 408" (polyoxyethylene oleyl ether), "EMULGEN (trade name) 105" (polyoxyethylene lauryl ether), "EMULGEN (trade name) 150" (polyoxyethylene lauryl ether), "EMULGEN (trade name) 220" (polyoxyethylene cetyl ether), "EMULGEN (trade name) 306P" (polyoxyethylene stearyl ether), "EMULGEN (trade name) 404" (polyoxyethylene oleyl ether), "EMULGEN (trade name) 430" (polyoxyethylene oleyl ether), "EMULGEN (trade name) 705" (polyoxyethylene alkyl ether), etc., which are produced by KAO CORPORATION.

It is allowable that only one kind of the nonionic surfactant is used singly, or that two or more kinds of the nonionic surfactant are used in a mixed manner. The blending amount of the nonionic surfactant in the entire amount of the water-based ink is, for example, in a range of 0.1% by weight to 20% by weight, preferably in a range of 0.2% by weight to 5% by weight, and more preferably in a range of 0.4% by weight to 1.5% by weight.

The term "same charge-ionic surfactant" means a surfactant having a same polarity (positive or negative charge) that is same as the polarity (positive or negative charge) of the colorant used in the water-based ink. For example, in a case that the colorant used in the water-based ink is an anionic colorant such as acid dye, the same charge-ionic surfactant is an anionic surfactant; in a case that the colorant used in the water-based ink is a cationic colorant such as basic dye, the same charge-ionic surfactant is a cationic surfactant. The reason for using the same charge-ionic surfactant and the nonionic surfactant at the same time is as follows. A water-insoluble liquid (solvent) is added to the water-based ink of the present teaching for imparting a predetermined function to the water-based ink. A surfactant is effective for dispersing the water-insoluble liquid stably in the water-based ink. However, in a case that the polarity of the surfactant is reverse to the polarity of the colorant, the surfactant does not work effectively for the following reason. When the surfactant is added into the water-based ink containing the water-insoluble liquid, surfactant molecules surround small domains of the water-insoluble liquid so that electric charge is produced on a surface of each domain of the water-insoluble liquid. These domains are dispersed stably in the water base ink by the repulsive force caused by the electric charges produced on the surface of the respective domains. However, the polarity of the surfactant is reverse to the polarity of the colorant, the electric charges produced on the surface of these domains are cancelled by the colorant, so that the repulsive force among the domains is not caused or cancelled. As result, the water-insoluble liquid cannot be dispersed stably in the water based ink. Thus, the surfactant having the same polarity as the polarity of the colorant is used. Further, since the deviation of charge in the molecules of the ionic surfactant is quite great, the molecules of ionic surfactants repulse strongly away from each other. Although the surfactant normally contributes to the dispersion stability by covering the surfaces of the dispersed water-insoluble liquid, it is not possible to tightly cover the surfaces of the dispersed water-insoluble liquid only by the molecules of the ionic surfactant due to the repulsive force therebetween. As a result, any sufficient dispersing stability cannot be achieved singly by the molecules of the ionic surfactant. In view of this, a nonionic surfactant which does not generate any electrostatic repulsive force is added so as to tightly cover the surfaces of the dispersed water-insoluble liquid, thereby allowing the water-insoluble liquid to disperse more stably in the water-based ink. Namely, since the water-based ink of the present teaching uses the water-insoluble liquid together with the same charge-ionic surfactant and the nonionic surfactant, it is possible to maintain the state that the water-insoluble liquid is dispersed stably in the water-based ink.

The anionic surfactant is exemplified, for example, by an anionic surfactant having a sulfate-structure ($-SO_3M$, wherein "M" is a counter ion different from a hydrogen atom), etc. It is also allowable to use, for example, any commercially available product as the anionic surfactant. The commercially available product is exemplified, for example, by "ALSCOPE (trade name) TH-330" produced by Toho Chemical Industry Co., Ltd.; "NEOPELEX (trade name) G-15" and "PELEX (trade name) TR" which are produced by KAO CORPORATION; "SUNNOL (trade name) NL1430", "UPON (trade name) LT-270", "UPON (trade name) LS-250", "SUNNOL (trade name) LM-1130" which are produced by Lion Corporation; and the like.

The cationic surfactant is exemplified, for example, by a quaternary ammonium salt represented by the following formula (4), etc.

[Formula 4]

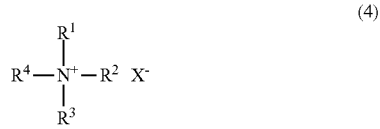
(4)

In the formula (4), each of $R^1$, $R^2$, $R^3$ and $R^4$ is a alkyl group of which carbon atom number is 1 to 18, and $R^1$, $R^2$, $R^3$ and $R^4$ may be identical to one another or may be different from one another. The alkyl group may be a straight-chain or branched-chain alkyl group, and is exemplified, for example, by a methyl group, an ethyl group, a n-propyl group, an isopropyl group, an octyl group, a caprylic group, a lauroyl group, a myristoyl group, a palmitoyl group, a stearyl group, etc. The alkyl group may have a substituted group such as a halogen atom.

In the formula (4), $X^-$ is an anion. Although the anion may be any anion, the anion is exemplified, for example, by a methylsulfate ion, an ethylsulfate ion, a sulfate ion, a nitrate ion, an acetate ion, a dicarboxylic acid ion (for example, a malic acid ion, an itaconic acid ion, etc.), a tricarboxylic acid ion (for example, a citric acid ion, etc.), a hydroxide ion, a halide ion, and the like. In a case that $X^-$ is a dicarboxylic acid ion or a tricarboxylic acid ion, the dicarboxylic acid ion or the tricarboxylic acid ion is a counter ion to two or three pieces of the quarterly ammonium ions.

The specific example of the quarterly ammonium salt represented by the formula (4) includes, for example, dimethylethyl octyl ammonium ethyl sulfate, dimethylethyl lauryl ammonium ethyl sulfate, tetrabutylammonium hydroxide, trimethyl lauryl ammonium hydrochloride, lauryltrimethyl ammonium chloride, cetyltrimethyl ammonium chloride, tetradecyl trimethyl ammonium chloride, octadecyltrimethyl ammonium chloride, etc.

It is allowable to use a substance different from the quarterly ammonium salt represented by the formula (4), as the cationic surfactant, the substance being exemplified, for example, by a primary, secondary or tertiary amine salt-type compound, alkylamine salt, di-alkylamine salt, aliphatic amine salt, benzalkonium salt, alkyl pyridinium salt, imidazolinium salt, sulfonium salt, phosphonium salt, onium salt, etc. The specific example of the cationic surfactant different from the quarterly ammonium salt represented by the formula (4) includes, for example, hydrochloride, acetate, etc. of lauryl amine, coco amine (coconut amine), rosin amine, etc.; benzyltributyl ammonium chloride, benzalkonium chloride, cetylpyridinium chloride, cetylpyridinium bromide, dihydroxyethyl lauryl amine, decyldimethylbenzyl ammonium chloride, dodecyldimethylbenzyl ammonium chloride, etc.

It is allowable to use, for example, a commercially available product as the cationic surfactant. The commercially available product is exemplified, for example, by "KACHIOGEN (trade name) ES-OW" and "KACHIOGEN (trade name) ES-L" which are produced by Dai-Ichi Kogyo Seiyaku Co., Ltd., etc.

It is allowable that only one kind of the same charge-ionic surfactant is used singly, or that two or more kinds of the same charge-ionic surfactant are used in a mixed manner. The blending amount of the same charge-ionic surfactant in the entire amount of the water-based ink is, for example, in a range of 0.1% by weight to 7.5% by weight, preferably in a range of 0.1% by weight to 2.5% by weight, and more preferably in a range of 0.15% by weight to 1% by weight.

The weight ratio of the water-soluble colorant and the same charge-ionic surfactant is preferably in a range of water-soluble colorant:same charge-ionic surfactant=20:1 to 4:15.

Figure 1B:
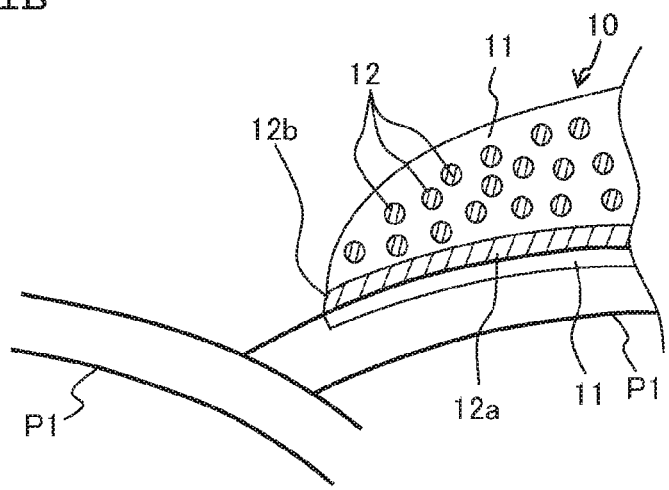
FIG. 1B is a conceptual view depicting the behavior of the water-based ink, following the state depicted in FIG. 1A.
Figure 1C:
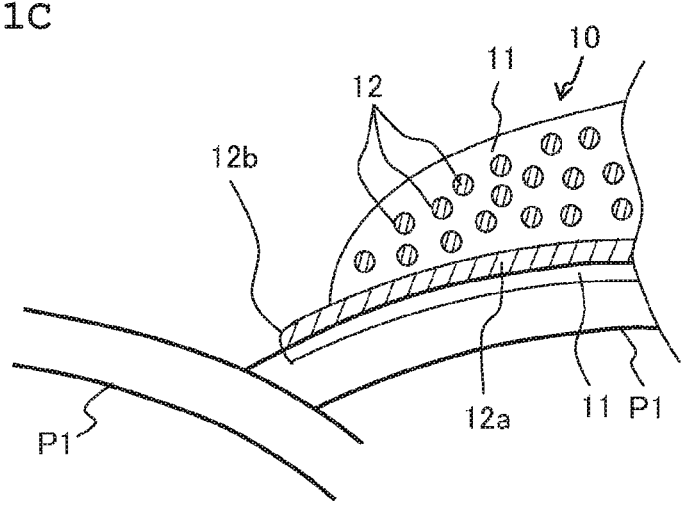
FIG. 1C is a conceptual view depicting the behavior of the water-based ink, following the state depicted in FIG. 1B.

In the water-based ink of the present teaching, the water-insoluble liquid is dispersed in the water by the nonionic surfactant and the same charge-ionic surfactant. According to the present teaching, for example, by allowing a specific water-insoluble liquid to be dispersed in the water, an effect of improving the drying property of the water-based ink can be expected. With reference to FIGS. 1A to 1C, an explanation will be given about a presumed mechanism of improving the drying property in the present teaching, with a case that the recording medium is paper (recording paper) as an example. In a case that the water-based ink is discharged by an ink-jet system onto a recording paper, at first, a droplet of the water-based ink (ink droplet) lands on a fiber P1 of the recording paper (hereinafter referred to as "paper fiber P1"). FIG. 1A conceptually depicts an ink droplet 10 landed on the paper fiber P1. Although a water-insoluble liquid 12 is present in the landed ink droplet 10 as liquid droplets dispersed therein, in a process that water 11 of the ink droplet 10 permeates into the paper fiber P1 and the paper fiber P1 swells, the liquid droplet of the water-insoluble liquid 12 is burst or split to cover the surface of the paper fiber P1 as indicated by a reference numeral "12a" in FIG. 1A. With this, the dispersion state of the water-insoluble liquid 12 is dissolved. Since the surface tension of the water-insoluble liquid 12 is lower than the surface tension of water (72 mN/m), the water-insoluble liquid 12 moves along (rolling on) the surface of the paper fiber P1, so as to project from the outer peripheral portion of the ink droplet 10, as indicated by a reference numeral "12b" in FIG. 1A. Namely, the water-insoluble liquid 12 moves so as to spread on the surface of the paper fiber P1 more quickly than the water 11 of the ink droplet 10. Next, as depicted in FIG. 1B, the water 11 of the ink droplet 10 catches up the forward end portion 12b of the water-insoluble liquid 12 covering the surface of the paper fiber P1, and the water 11 permeates into the paper fiber P1 below the forward end portion 12b. Next, as depicted in FIG. 1C, in a similar manner as the behavior depicted in FIG. 1A, when water 11 of the ink droplet 10 permeates into the paper fiber P1, the liquid droplet of the water-insoluble liquid 12 is burst to cover the surface of the paper fiber P1 as indicated by the reference numeral "12a" as a portion (forward end portion) of the water-insoluble liquid 12, and the forward end portion 12b of the water-insoluble liquid 12 moves so as to spread on the surface of the paper fiber P1 more quickly than the water 11 of the ink droplet 10. Then, the behaviors depicted in FIGS. 1A to 1C are repeated to thereby allow the water-based ink to permeate in the paper while quickly spreading on the paper fiber P1, without remaining on the paper fiber P1, thus allowing the ink droplet 10 landed on the paper to be dried easily. Note that, however, the above-described mechanism is merely a presumption, and the present teaching is not limited to and restricted by this presumed mechanism.

In some cases, the water-based ink of the present teaching appears to be muddy to some extent in a state before the water-based ink is discharged by the ink-jet system, since the water-insoluble liquid is dispersed. However, when the water-based ink is landed on the recording medium, the dispersion state of the water-insoluble liquid is no longer maintained as described above, and the muddy appearance of the water-based ink has also disappeared.

It is possible to use a variety of kinds of water-insoluble liquid as a specific water-insoluble liquid having the effect of improving the drying property of the water-based ink. It is more effective to use a water-insoluble liquid which contains a polar functional group in the molecule and of which surface tension is not less than 30 mN/m. Among the variety of kinds of water-insoluble liquid, a water-insoluble liquid which hardly emit any odor can be exemplified, for example, by diethyl adipate, diethyl phthalate, polypropylene glycol, etc. The boiling point and the structural formula of the water-insoluble liquid are indicated in Table 1 and Formulae (5) to (7), as follows.

TABLE 1

| Water-insoluble liquid | Diethyl adipate | Diethyl phthalate | PPG 400 |
|---|---|---|---|
| Boiling point (° C.) | 251 | 296 | 273< |
| Structural formula | Formula (5) | Formula (6) | Formula (7) |

[Formula 5]

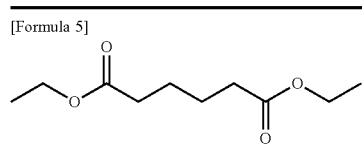

(5)

[Formula 6]

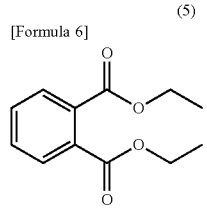

(6)

[Formula 7]

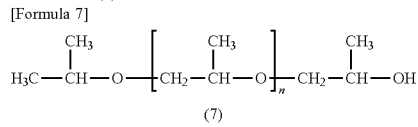

(7)

Since the boiling point of the respective water-insoluble liquids as described above is not less than 250 degrees Celsius, these water-insoluble liquids have a low volatility and any odor of the water-based ink is also suppressed by these water-insoluble liquids.

Although not having any sufficient drying property, the water-insoluble liquid capable of suppressing the odor of the water-based ink can be exemplified, for example, by decane, undecane, dodecane, etc.

The blending amount of the water-insoluble liquid (water-insoluble liquid ratio) in the entire amount of the water-based ink is, for example, in a range of 1% by weight to 30% by weight, preferably in a range of 2% by weight to 20% by weight, and more preferably in a range of 4% by weight to 15% by weight.

In the water-based ink of the present teaching, the weight ratio of the water-insoluble liquid (X) and the nonionic surfactant (Y) (X:Y) is preferably in a range of X:Y=25:1 to 1:8, is more preferably in a range of X:Y=10:1 to 1:4.

In the water-based ink of the present teaching, the weight ratio of the water-insoluble liquid (X) and the same charge-ionic surfactant (Z) (X:Z) is preferably in a range of X:Z=25:1 to 1:3, is more preferably in a range of X:Z=20:1 to 4:15.

In the water-based ink of the present teaching, the weight ratio of the water and the water-insoluble liquid is preferably in a range of water:water-insoluble liquid=60:1 to 1:1, more preferably in a range of water:water-insoluble liquid=30:1 to 2:1, further more preferably in a range of water:water-insoluble liquid=15:1 to 8:3.

The water-based ink of the present teaching preferably further contains a water-soluble organic solvent. The water-soluble organic solvent is exemplified, for example, by a humectant which prevents the water-based ink from drying at an end of a nozzle in an ink-jet head.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; 1,3-dimethyl-2-imidazolidinone; and the like. The polyalkylene glycol is not limited, and is exemplified, for example, by polyethylene glycol, polypropylene glycol which is water-soluble and which has a low molecular weight (not more than 200), etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination. Among the above-described humectants, it is preferable to use polyvalent alcohols such as alkylene glycol, glycerol, etc. Note that these humectants used in water-based ink are normally water-soluble.

The blending amount of the humectant in the entire amount of the water-based ink is, for example, in a range of 0% by weight to 95% by weight, preferably in a range of 5% by weight to 80% by weight, and more preferably in a range of 5% by weight to 50% by weight.

The water-based ink may further contain any known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

Next, a method for producing the water-based ink for ink-jet recording of the present teaching will be explained with an example. Note that, however, the producing method is merely an example, and that the water-based ink of the present teaching may be produced in any method.

[Step of Preparing First Liquid]

At first, the water-soluble colorant, and the water (half of the blending amount) are mixed and agitated uniformly with a known method so as to prepare a first liquid. The water-soluble colorant may be mixed as a solid content with the water, or may be mixed as an aqueous solution of the water-soluble colorant with the water.

[Step of Preparing Second Liquid]

Next, the water-insoluble liquid and the nonionic surfactant are mixed and agitated uniformly with a known method so as to prepare a second liquid. It is preferred that the weight ratio of the water-insoluble liquid (X) and the nonionic surfactant (Y) (X:Y) is adjusted to be in a range of X:Y=10:1 to 1:4 as described above.

[Step of Preparing Third Liquid]

Next, the water (remaining half of the blending amount), and the same charge-ionic surfactant are mixed and agitated uniformly with a known method so as to prepare a third liquid.

[Step of Preparing Fourth Liquid]

Next, the third liquid is dripped as droplets to the second liquid so as to prepare a fourth liquid. It is preferred that the weight ratio of the water-insoluble liquid (X) and the same charge-ionic surfactant (Z) (X:Z) is adjusted to be in a range of X:Z=25:1 to 1:3 as described above.

[Step of Preparing Water-Based Ink]

Subsequently, the first liquid and the fourth liquid are mixed each other. The first liquid may be dropped as droplets to the fourth liquid or the fourth liquid may be dropped as droplets to the first liquid, and thus a water-based ink of the present teaching can be prepared.

The production method may further includes a filtration step for performing filtration after the step of preparing the water-based ink so as to remove any undissolved matter from the water-based ink with a filter.

Next, it is possible to produce an ink cartridge by accommodating the water-based ink of the present teaching in an ink case. For example, it is allowable to use any known ink case of ink cartridge (body for ink cartridge) as the ink case (body) of the ink cartridge.

Next, an ink-jet recording apparatus and an ink-jet recording method of the present teaching will be explained.

The ink-jet recording apparatus of the present teaching is an ink-jet recording apparatus including an ink-accommodating section and an ink discharge mechanism, wherein an ink accommodated in the ink accommodating section is discharged by the ink discharge mechanism. The water-based ink of the present teaching is accommodated in the ink accommodating section. The ink accommodating section may be an exchangeable ink cartridge, as described above.

The ink-jet recording method of the present teaching is an ink-jet recording method for performing recording on a recording medium by discharging a water-based ink by the ink-jet system onto the recording medium. The water-based ink for ink-jet recording of the present teaching may be used as the water-based ink.

The ink-jet recording method of the present teaching can be practiced by, for example, using the ink-jet recording apparatus of the present teaching. The recording includes printing text (character, letter), printing image or picture, and printing, etc.

Figure 2:
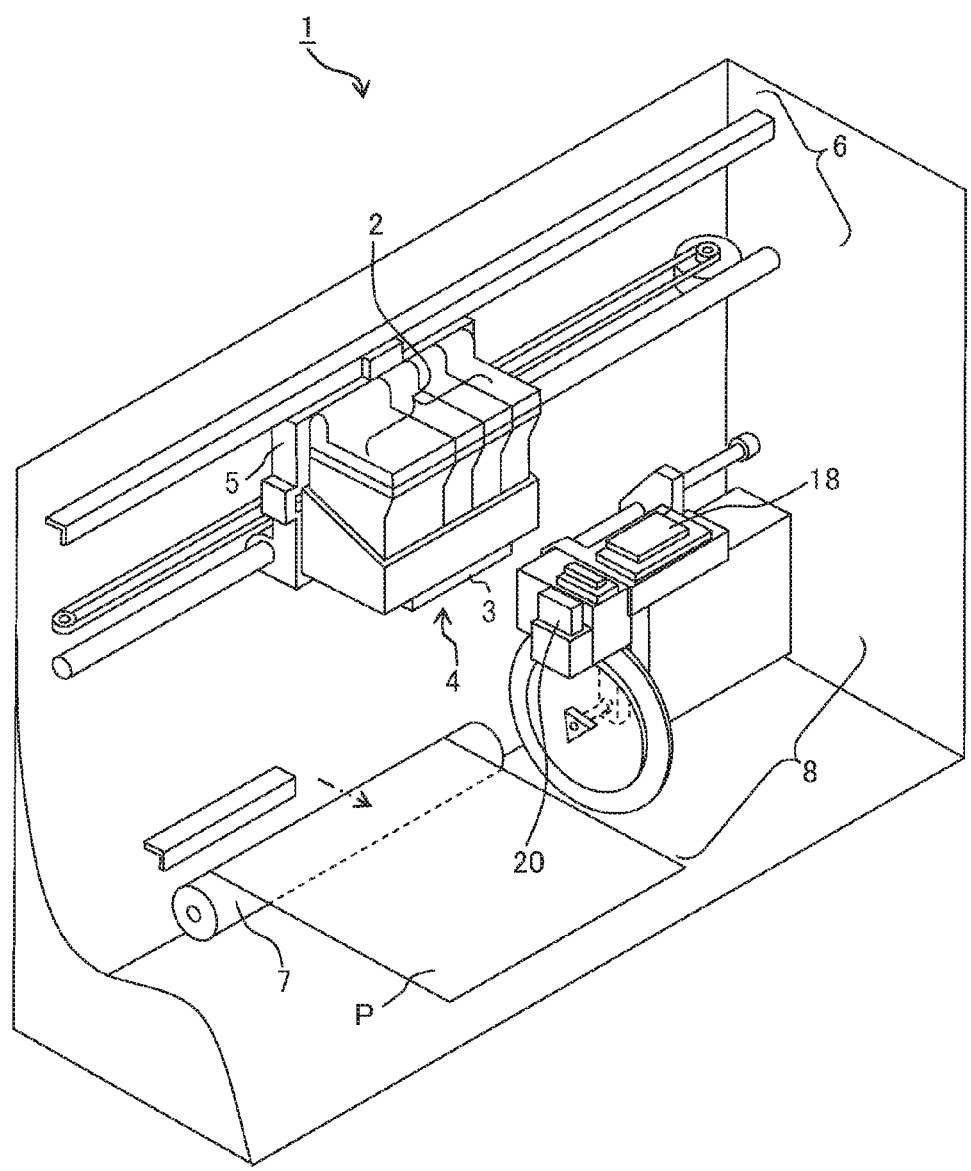
FIG. 2 is a schematic perspective view depicting the construction of an example of the construction of an ink-jet recording apparatus of the present teaching.

FIG. 2 depicts the configuration of an example of the ink-jet recording apparatus of the present teaching. As depicted in FIG. 2, an ink-jet recording apparatus 1 includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks respectively, the four colors being yellow, magenta, cyan and black. For example, at least one of the water-based yellow ink, the water-based magenta ink and the water-based cyan ink is the water-based ink for ink-jet recording of the present teaching. It is allowable to use commercially available or general water-based inks as the remaining inks other than the at least one water-based ink for ink-jet recording of the present teaching. The ink-jet head 3 disposed on the head unit 4 performs recording on a recording medium P (for example, a recording paper or recording paper sheet P). The four ink cartridges 2 and the head unit 4 are provided or arranged on the carriage 5. The driving unit 6 reciprocates the carriage 5 in a linear direction. As the driving unit 6, it is possible to use, for example, any known driving unit (see, for example, Japanese Patent Application Laid-open No. 2008-246821). The platen roller 7 extends in the reciprocating direction of the carriage 5 and is arranged to face or be opposite to the ink-jet head 3.

The purge device 8 sucks any unsatisfactory ink which contains air bubbles, etc. accumulated in the ink-jet head 3. As the purge device 8, it is possible to use, for example, any known purge device (for example, see Japanese Patent Application Laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement (reciprocating movement) of the carriage 5. In FIG. 2, a cap 18 is provided to cover a plurality of nozzles of the ink-jet head 3 which is returned to a reset position upon completion of the recording, so as to prevent the water-based ink from drying.

In the ink-jet recording apparatus 1 of this example, the four ink cartridges 2 are provided, together with the head unit 4, on one carriage 5. Note that, however, the present teaching is not limited to this. In the ink-jet recording apparatus 1, each of the four ink cartridges 2 may be provided on another carriage which is different from that for the head unit 4. Alternatively, each of the four ink cartridges 2 may be arranged and fixed inside the ink-jet recording apparatus 1, rather than being provided on the carriage 5. In such an aspect, for example, each of the four ink cartridges 2 and the head unit 4 which is provided on the carriage 5 are connected with a tube, etc., and each of the water-based inks is supplied from one of the four ink cartridges 2 to the head unit 4 via the tube.

An ink-jet recording using the ink-jet recording apparatus 1 is performed, for example, in the following manner. At first, a recording paper P is supplied or fed, for example, from a paper feeding cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based inks discharged from the ink-jet head 3. The odor is reduced in the water-based ink of the present teaching. The recording paper P on which the recording has been performed is discharged from the ink-jet recording apparatus 1. Since the water-based ink of the present teaching has an excellent stability, any unevenness in the quality is suppressed in a recorded matter recorded with the water-based ink of the present teaching. In FIG. 2, the paper feeding mechanism and discharging mechanism for the recording paper P are omitted.

Although the apparatus depicted in FIG. 2 adopts an ink-jet head of the serial type, the present teaching is not limited to this. The ink-jet recording apparatus may be an apparatus adopting an ink-jet head of the line type.

EXAMPLES

Next, examples of the present teaching will be explained together with comparative examples. Note that the present teaching is not limited to and is not restricted by the examples and the comparative examples which will be described below.

Examples 1-1 to 3-4 and Comparative Examples 1-1 to 3-4

A water-soluble colorant and water (half the water amount indicated in TABLE 2 to TABLE 4 as follows) in Water-based Ink Composition (TABLE 2 to TABLE 4) were mixed and agitated uniformly or homogeneously; and thus the first liquid was prepared. Subsequently, the water-insoluble liquid and the nonionic surfactant in Water-based Ink Composition (TABLE 2 to TABLE 4) were mixed and agitated uniformly; and thus the second liquid was prepared. Then, the water (remaining half the water amount indicated in TABLE 2 to TABLE 4), and the same charge-ionic surfactant in Water-based Ink Composition (TABLE 2 to TABLE 4) were mixed and agitated uniformly; and thus the third liquid was prepared. Then, the second liquid was dripped as droplets to the third liquid, and thus the fourth liquid was prepared. Next, the first liquid was dripped as droplets to the fourth liquid, and thus water-based inks of Examples 1-1 to 3-4 and Comparative Examples 1-1 to 3-4 were obtained.

With respect to the water-based inks of Examples 1-1 to 3-4 and Comparative Examples 1-1 to 3-4, (a) evaluation of odor, (b) evaluation of stability and (c) evaluation of drying property were performed by the following methods.

(a) Evaluation of Odor

Took a smell of each of the water-based inks of Examples 1-1 to 3-4 and Comparative Examples 1-1 to 3-4 to confirm whether or not there was any odor. If there was no odor, it was judged "G" (passed); if there was any odor, it was judged "NG" (failed).

(b) Evaluation of Stability

The water-based inks of Examples 1-1 to 3-4 and Comparative Examples 1-1 to 3-4 after the preparation were visually observed, and the stability was evaluated in accordance with the following evaluation criterion.

[Evaluation Criterion for Stability]

AA: The water-based ink was not separated.

A: Although the water-based ink was not separated, a bubble was observed in the liquid surface.

A: Although the water-based ink was not separated, many bubbles were observed in the liquid surface.

B: It was observed that the water-based ink was separated to some extent.

C: The water-based ink was completely separated.

(c) Evaluation of Drying Property

An ink-jet printer "MFC-J4510N", manufactured by BROTHER KOGYO KABUSHIKI KAISHA was used to record an image including a single-color patch on a plain paper, with a resolution of 600 dpi×300 dpi, by using each of the water-based inks of Examples 1-1 to 3-4 and Comparative Examples 1-1 to 3-4. Regarding each of the images recorded with one of the water-based inks of Examples 1-1 to 3-4 and Comparative Examples 1-1 to 3-4, the single color patch was rubbed by a cotton swab after 5 seconds elapsed from the recording, and the drying property was evaluated in accordance with the following evaluation criterion. As the plain paper, "Office Paper W" (trade name) produced by FUJITSU COWORCO LIMITED was used.

[Evaluation Criterion for Drying Property]

(Regarding the Plain Paper)

G: The single-color patch was dried at a point of time 5 seconds had elapsed since the recording.

NG: The single-color patch was not dried at the point of time 5 seconds had elapsed since the recording.

The compositions of the water-based inks of Examples 1-1 to 1-21 and Comparative Examples 1-1 to 1-8 in each of which the colorant used was C. I. Acid Red 52 as the anionic colorant and the results of evaluation are indicated in TABLE 2 as follows. Further, the compositions of the water-based inks of Examples 2-1 to 2-4 and Comparative Examples 2-1 to 2-4 in each of which the colorant used was C. I. Direct Yellow 132 as the anionic colorant and the results of evaluation are indicated in TABLE 3 as follows. Furthermore, the compositions of the water-based inks of Examples 3-1 to 3-4 and Comparative Examples 3-1 to 3-4 in each of which the colorant used was C. I. Direct Blue 199 as the anionic colorant and the results of evaluation are indicated in TABLE 4 as follows.

Table 2 to Table 4 (Following)—Legend

*1: Polyoxyethylene sorbitol tetraoleate, produced by Toho Chemical Industry Co., Ltd.

*2: Acetylenic glycol-based surfactant (ethylene oxide (10 mol) adduct of diol); produced by Nisshin Chemical Co., Ltd.; active ingredient amount=100%

*3: Anionic surfactant having a sulfate-structure; produced by Toho Chemical Industry Co., Ltd.; active ingredient amount=in a range of 25% by weight to 30% by weight

*4: Anionic surfactant having a sulfate-structure; produced by KAO CORPORATION; active ingredient amount=16% by weight

TABLE 2

| | | | EXAMPLES | | | | | | | | |
|---|---|---|---|---|---|---|---|---|---|---|---|
| | | | 1-1 | 1-2 | 1-3 | 1-4 | 1-5 | 1-6 | 1-7 | 1-8 | 1-9 |
| Composition of water-based ink (% by weight) | Water-soluble colorant | C. I. Acid Red 52 | 2.0 | 2.0 | 2.0 | 2.0 | 2.0 | 2.0 | 2.0 | 2.0 | 2.0 |
| | Water-insoluble liquid | Dodecane | 2.5 | 2.5 | 2.5 | 2.5 | — | — | — | — | — |
| | | Diethyl adipate | — | — | — | — | 2.5 | 2.5 | 2.5 | 2.5 | 5.0 |
| | Nonionic Surfactant | SORBON (trade name) TR-843 (*1) | 0.50 | 0.50 | — | — | 0.50 | 0.50 | — | — | — |
| | | OLFIN (trade name) E1010 (*2) | — | — | 0.50 | 0.50 | — | — | 0.50 | 0.50 | 0.50 |
| | Same charge-ionic Surfactant | ALSCOPE (trade name) TH-330 (*3) | 0.25 | — | 0.25 | — | 0.25 | — | 0.25 | — | — |
| | | NEOPELEX (trade name) G-15 (*4) | — | 0.25 | — | 0.25 | — | 0.25 | — | 0.25 | 0.25 |
| | Water | | balance | balance | balance | balance | balance | balance | balance | balance | balance |
| Odor | | | G | G | G | G | G | G | G | G | G |
| Stability | | | AA | AA | AA | AA | AA | AA | AA | AA | AA |
| Drying property | | | NG | NG | NG | NG | G | G | G | G | G |

TABLE 2-continued

|  |  |  | EXAMPLES | | | | | | | | |
|---|---|---|---|---|---|---|---|---|---|---|---|
|  |  |  | 1-10 | 1-11 | 1-12 | 1-13 | 1-14 | 1-15 | 1-16 | 1-17 | 1-18 |
| Composition of water-based ink (% by weight) | Water-soluble colorant | C. I. Acid Red 52 | 2.0 | 2.0 | 2.0 | 2.0 | 2.0 | 2.0 | 2.0 | 2.0 | 2.0 |
|  | Water-insoluble liquid | Dodecane | — | — | — | — | — | — | — | — | — |
|  |  | Diethyl adipate | 7.5 | 2.5 | 2.5 | 2.5 | 2.5 | 2.5 | 2.5 | 1.0 | 3.5 |
|  | Nonionic Surfactant | SORBON (trade name) TR-843 (*1) | — | — | — | — | — | — | — | — | — |
|  |  | OLFIN (trade name) E1010 (*2) | 0.50 | 0.10 | 0.25 | 10.00 | 20.00 | 0.50 | 0.50 | 0.30 | 0.80 |
|  | Same charge-ionic Surfactant | ALSCOPE (trade name) TH-330 (*3) | — | — | — | — | — | — | — | — | — |
|  |  | NEOPELEX (trade name) G-15 (*4) | 0.25 | 0.25 | 0.25 | 0.25 | 0.25 | 0.10 | 7.50 | 0.20 | 0.40 |
|  | Water |  | balance | balance | balance | balance | balance | balance | balance | balance | balance |
| Odor |  |  | G | G | G | G | G | G | G | G | G |
| Stability |  |  | A | A | AA | AA | A | AA | AA | AA | AA |
| Drying property |  |  | G | G | G | G | G | G | G | G | G |

|  |  |  | EXAMPLES | | |
|---|---|---|---|---|---|
|  |  |  | 1-19 | 1-20 | 1-21 |
| Composition of water-based ink (% by weight) | Water-soluble colorant | C. I. Acid Red 52 | 1.0 | 3.0 | 4.5 |
|  | Water-insoluble liquid | Dodecane | — | — | — |
|  |  | Diethyl adipate | 2.5 | 2.5 | 2.5 |
|  | Nonionic Surfactant | SORBON (trade name) TR-843 (*1) | — | — | — |
|  |  | OLFIN (trade name) E1010 (*2) | 0.50 | 0.50 | 0.50 |
|  | Same charge-ionic Surfactant | ALSCOPE (trade name) TH-330 (*3) | — | — | — |
|  |  | NEOPELEX (trade name) G-15 (*4) | 0.25 | 0.25 | 0.25 |
|  | Water |  | balance | balance | balance |
| Odor |  |  | G | G | G |
| Stability |  |  | AA | AA | A |
| Drying property |  |  | G | G | G |

|  |  |  | COMPARATIVE EXAMPLES | | | | | | | |
|---|---|---|---|---|---|---|---|---|---|---|
|  |  |  | 1-1 | 1-2 | 1-3 | 1-4 | 1-5 | 1-6 | 1-7 | 1-8 |
| Composition of water-based ink (% by weight) | Water-soluble colorant | C. I. Acid Red 52 | 2.0 | 2.0 | 2.0 | 2.0 | 2.0 | 2.0 | 2.0 | 2.0 |
|  | Water-insoluble liquid | Dodecane | 2.5 | 2.5 | — | — | 2.5 | 2.5 | — | — |
|  |  | Diethyl adipate | — | — | 2.5 | 2.5 | — | — | 2.5 | 2.5 |
|  | Nonionic Surfactant | SORBON (trade name) TR-843 (*1) | 0.50 | — | 0.50 | — | — | — | — | — |
|  |  | OLFIN (trade name) E1010 (*2) | — | 0.50 | — | 0.50 | — | — | — | — |
|  | Same charge-ionic Surfactant | ALSCOPE (trade name) TH-330 (*3) | — | — | — | — | 0.50 | — | 0.50 | — |
|  |  | NEOPELEX (trade name) G-15 (*4) | — | — | — | — | — | 0.50 | — | 0.50 |
|  | Water |  | balance | balance | balance | balance | balance | balance | balance | balance |
| Odor |  |  | G | G | G | G | G | G | G | G |
| Stability |  |  | C | C | B | C | C | C | B | B |
| Drying property |  |  | NG | NG | G | G | NG | NG | G | G |

TABLE 3

|  |  |  | EXAMPLES | | | | COMPARATIVE EXAMPLES | | | |
|---|---|---|---|---|---|---|---|---|---|---|
|  |  |  | 2-1 | 2-2 | 2-3 | 2-4 | 2-1 | 2-2 | 2-3 | 2-4 |
| Composition of water-based ink (% by weight) | Water-soluble colorant | C. I. Direct Yellow 132 | 2.0 | 2.0 | 2.0 | 2.0 | 2.0 | 2.0 | 2.0 | 2.0 |
|  | Water-insoluble liquid | Dodecane | — | — | — | — | — | — | — | — |
|  |  | Diethyl adipate | 2.5 | 2.5 | 2.5 | 2.5 | 2.5 | 2.5 | 2.5 | 2.5 |
|  | Nonionic Surfactant | SORBON (trade name) TR-843 (*1) | 0.50 | 0.50 | — | — | 0.50 | — | — | — |
|  |  | OLFIN (trade name) E1010 (*2) | — | — | 0.50 | 0.50 | — | 0.50 | — | — |

TABLE 3-continued

|  |  |  | EXAMPLES | | | | COMPARATIVE EXAMPLES | | | |
| --- | --- | --- | --- | --- | --- | --- | --- | --- | --- | --- |
|  |  |  | 2-1 | 2-2 | 2-3 | 2-4 | 2-1 | 2-2 | 2-3 | 2-4 |
|  | Same charge-ionic Surfactant | ALSCOPE (trade name) TH-330 (*3) | 0.25 | — | 0.25 | — | — | — | 0.50 | — |
|  |  | NEOPELEX (trade name) G-15 (*4) | — | 0.25 | — | 0.25 | — | — | — | 0.50 |
|  | Water |  | balance | balance | balance | balance | balance | balance | balance | balance |
| Odor |  |  | G | G | G | G | G | G | G | G |
| Stability |  |  | A- | A- | A | A | C | C | C | C |
| Drying property |  |  | G | G | G | G | G | G | G | G |

TABLE 4

|  |  |  | EXAMPLES | | | | COMPARATIVE EXAMPLES | | | |
| --- | --- | --- | --- | --- | --- | --- | --- | --- | --- | --- |
|  |  |  | 3-1 | 3-2 | 3-3 | 3-4 | 3-1 | 3-2 | 3-3 | 3-4 |
| Composition of water-based ink (% by weight) | Water-soluble colorant | C. I. Direct Blue 199 | 2.0 | 2.0 | 2.0 | 2.0 | 2.0 | 2.0 | 2.0 | 2.0 |
|  | Water-insoluble liquid | Dodecane | — | — | — | — | — | — | — | — |
|  |  | Diethyl adipate | 2.5 | 2.5 | 2.5 | 2.5 | 2.5 | 2.5 | 2.5 | 2.5 |
|  | Nonionic Surfactant | SORBON (trade name) TR-843 (*1) | 0.50 | 0.50 | — | — | 0.50 | — | — | — |
|  |  | OLFIN (trade name) E1010 (*2) | — | — | 0.50 | 0.50 | — | 0.50 | — | — |
|  | Same charge-ionic Surfactant | ALSCOPE (trade name) TH-330 (*3) | 0.25 | — | 0.25 | — | — | — | 0.50 | — |
|  |  | NEOPELEX (trade name) G-15 (*4) | — | 0.25 | — | 0.25 | — | — | — | 0.50 |
|  | Water |  | balance | balance | balance | balance | balance | balance | balance | balance |
| Odor |  |  | G | G | G | G | G | G | G | G |
| Stability |  |  | A | A | AA | AA | C | C | C | C |
| Drying property |  |  | G | G | G | G | G | G | G | G |

As indicated in TABLE 2, in Examples 1-1 to 1-21, even though any one of dodecane and diethyl adipate was contained as the water-insoluble liquid in the ink, the water-insoluble liquid was stably dispersed in the ink, since the same charge-ionic surfactant and the nonionic surfactant were contained at the same time. In particular, in Examples 1-1 to 1-9, 1-12, 1-13 and 1-15 to 1-20 in which the water-insoluble liquid:the nonionic surfactant (weight ratio)=10:1 to 1:4 and the ratio of the water-soluble colorant was in a range of 1% by weight to 3% by weight, the stability was particularly satisfactory. In a case that diethyl adipate (boiling point: 251 degrees Celsius) was used as the water-insoluble liquid, both of the drying property and the suppression of odor were satisfactory. In a case that dodecane (boiling point: 216 degrees Celsius) was used as the water-insoluble liquid, the odor was suppressed but the drying property was not sufficient. On the other hand, in Comparative Examples 1-1 to 1-4 in which the same charge-ionic surfactant was not used and in Comparative Examples 1-5 to 1-8 in which the nonionic surfactant was not used, the stability of the ink was low.

Further, as indicated in TABLE 3, the stability, the drying property and the suppression of odor were satisfactory in Examples 2-1 to 2-4. On the other hand, in Comparative Examples 2-1 and 2-2 in which the same charge-ionic surfactant was not used and in Comparative Examples 2-3 and 2-4 in which the nonionic surfactant was not used, the drying property and the suppression of odor were satisfactory but the stability was low.

Furthermore, as indicated in TABLE 4, the stability, the drying property and the suppression of odor were satisfactory in Examples 3-1 to 3-4. On the other hand, in Comparative Examples 3-1 and 3-2 in which the same charge-ionic surfactant was not used and in Comparative Examples 3-3 and 3-4 in which the nonionic surfactant was not used, the drying property and the suppression of odor were satisfactory, but the stability was low.

As described above, the water-based ink of the present teaching has excellent stability although the water-based ink contains the water-insoluble liquid, and also has excellent drying property and is excellent in the suppression of odor by containing the specific water-insoluble liquid. The usage of the water-based ink of the present teaching is not particularly limited, and is widely applicable to a variety of kinds of ink-jet recording.

What is claimed is:

1. A water-based ink for ink-jet recording comprising:
   a water-soluble colorant;
   water in an amount not less than 40% by weight based on a total weight of the water-based ink;
   a water-insoluble liquid, wherein a weight ratio of water:water-insoluble liquid ranges from 30:1 to 2:1;
   a nonionic surfactant; and
   an ionic surfactant having a polarity same as that of the water-soluble colorant;
   wherein the water-insoluble liquid is dispersed in the water by the nonionic surfactant and the ionic surfactant having the polarity same as that of the water-soluble colorant.

2. The water-based ink for ink-jet recording according to claim 1, wherein a boiling point of the water-insoluble liquid is not less than 250 degrees Celsius.

3. The water-based ink for ink-jet recording according to claim 2, wherein the water-insoluble liquid is selected from the group consisting of diethyl adipate, diethyl phthalate, polypropylene glycol, and a combination thereof.

4. The water-based ink for ink-jet recording according to claim 2, wherein the water-insoluble liquid is diethyl adipate.

5. The water-based ink for ink-jet recording according to claim 1, wherein the water-insoluble liquid is a saturated hydrocarbon containing not less than 10 carbon atoms.

6. The water-based ink for ink-jet recording according to claim 1, wherein the water-insoluble liquid is dodecane.

7. The water-based ink for ink-jet recording according to claim 1, wherein a weight ratio of the water-insoluble liquid (X) and the nonionic surfactant (Y) is in a range of X:Y=10:1 to 1:4, and a weight ratio of the water-insoluble liquid (X) and the ionic surfactant having the polarity same as that of the water-soluble colorant (Z) is in a range of X:Z=25:1 to 1:3.

8. The water-based ink for ink-jet recording according to claim 1, wherein a blending amount of the water-soluble colorant in an entire amount of the water-based ink is in a range of 1% by weight to 3% by weight.

9. The water-based ink for ink-jet recording according to claim 1, wherein the nonionic surfactant includes at least one of a sorbit-based surfactant and an acetylenic glycol-based surfactant.

10. The water-based ink for ink-jet recording according to claim 1, wherein the ionic surfactant having the polarity same as that of the water-soluble colorant includes at least one of an anionic surfactant having a sulfate-structure and a quaternary ammonium salt represented by the following formula (4):

[Formula 4]

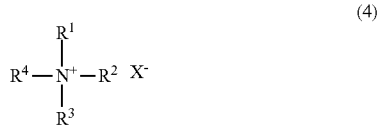

(4)

wherein in the formula (4), each of $R_1$, $R^2$, $R^3$ and $R^4$ is an alkyl group of which carbon atom number is 1 to 18, and $R^1$, $R^2$, $R^3$ and $R^4$ are identical to one another or are different from one another.

11. A water-based ink for ink-jet recording according to claim 1, wherein a weight ratio of water : water-insoluble liquid ranges from 15:1 to 8:3.

12. An ink cartridge configured to contain a water-based ink for ink-jet recording, wherein the water-based ink is the water-based ink for ink-jet recording as defined in claim 1.

13. A method for producing the water-based ink for ink-jet recording as defined in claim 1, the method comprising:
a step of preparing a first liquid by mixing a water-soluble colorant and water; and
a step of preparing a second liquid by mixing a water-insoluble liquid and a nonionic surfactant;
a step of preparing a third liquid by mixing the water and an ionic surfactant having a polarity same as that of the water-soluble colorant;
a step of preparing a fourth liquid by mixing the second liquid and the third liquid; and
a step of preparing the water-based ink for ink-jet recording by mixing the fourth liquid and the first liquid.

14. The method for producing the water-based ink for ink-jet recording according to claim 13, wherein boiling point of the water-insoluble liquid is not less than 250 degrees Celsius.

15. The method for producing the water-based ink for ink-jet recording according to claim 14, wherein the water-insoluble liquid is one kind selected from the group consisting of: diethyl adipate, diethyl phthalate and polypropylene glycol.

16. The method for producing the water-based ink for ink-jet recording according to claim 14, wherein the water-insoluble liquid is diethyl adipate.

17. The method for producing the water-based ink for ink-jet recording according to claim 13, wherein the water-insoluble liquid is a saturated hydrocarbon of which carbon atom number is not less than 10.

18. The method for producing the water-based ink for ink-jet recording according to claim 17, wherein the water-insoluble liquid is dodecane.

19. The method for producing the water-based ink for ink-jet recording according to claim 13, wherein in the step of preparing the second liquid, weight ratio of the water-insoluble liquid (X) and the nonionic surfactant (Y) is adjusted to be in a range of X:Y =10:1 to 1:4; and
in the step of preparing the fourth liquid, weight ratio of the water-insoluble liquid (X) and the ionic surfactant having the polarity same as that of the water-soluble colorant (Z) is adjusted to be in a range of X:Z=25:1 to 1:3.

* * * * *

UNITED STATES PATENT AND TRADEMARK OFFICE
CERTIFICATE OF CORRECTION

PATENT NO. : 9,580,617 B2
APPLICATION NO. : 15/089907
DATED : February 28, 2017
INVENTOR(S) : Hiroyuki Tanaka et al.

It is certified that error appears in the above-identified patent and that said Letters Patent is hereby corrected as shown below:

In Column 19, Claim 10, Line 40:
Please delete "each of $R_1$," and insert therefor --each of $R^1$,--

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*